April 2, 1957 J. C. CHRISTENSEN ET AL 2,787,557
MARINE ORGANISM RESISTANT COMPOSITION AND METHOD
OF COATING STRUCTURAL ARTICLES THEREWITH
Filed May 11, 1954 2 Sheets-Sheet 2

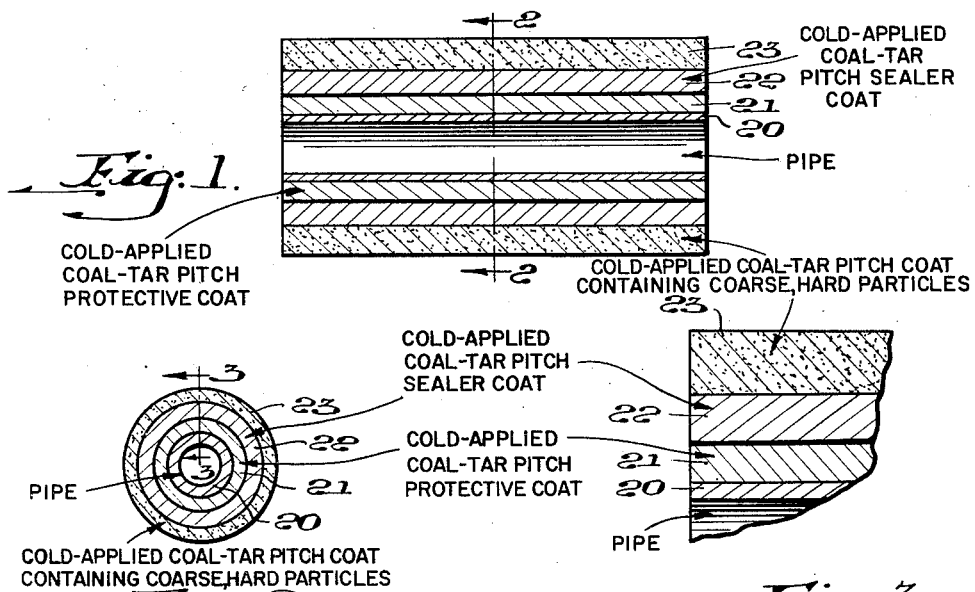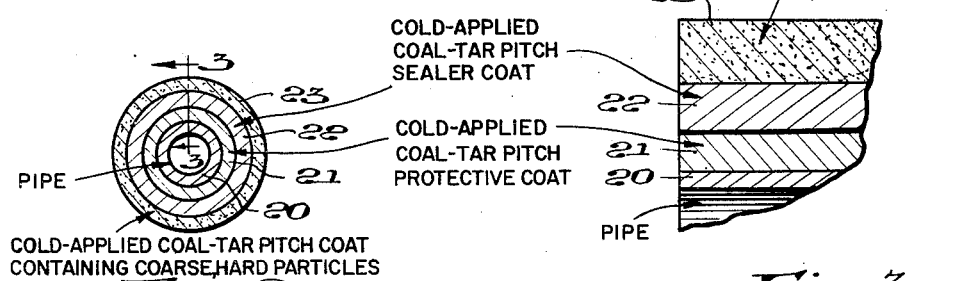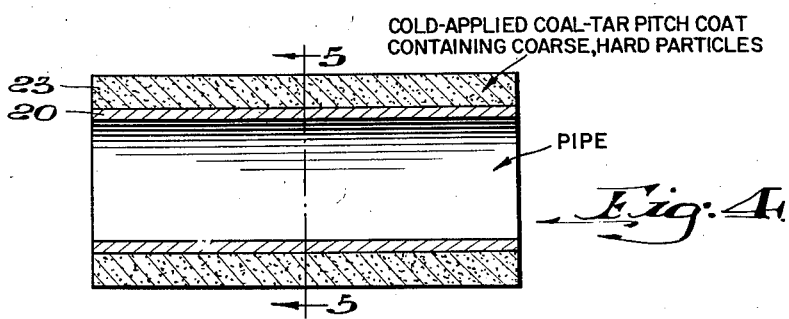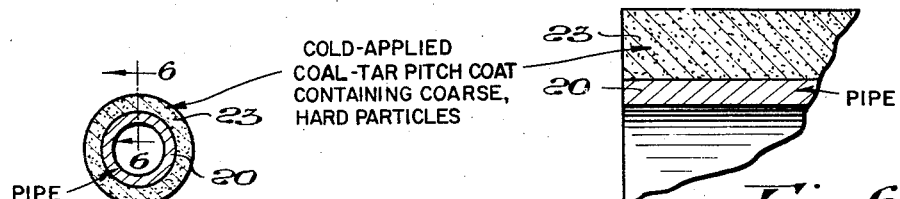

INVENTOR.
WILLIAM F. FAIR, JR.
John C. Christensen
BY
Walter J. Monacelli
their ATTORNEY United States Patent Office 2,787,557
Patented Apr. 2, 1957

2,787,557

MARINE ORGANISM RESISTANT COMPOSITION AND METHOD OF COATING STRUCTURAL ARTICLES THEREWITH

John C. Christensen, Westfield, and William F. Fair, Jr., Cranford, N. J., assignors to Koppers Company, Inc., a corporation of Delaware Application May 11, 1954, Serial No. 428,962

11 Claims. (Cl. 117—30)

This invention relates in general to compositions of matter and a process for preparation thereof. More specifically it is directed to coating compositions which will not be substantially affected by pestiferous marine organisms when permanently immersed in or in contact with water, particularly salt water and brackish water, especially for surfaces which cannot be easily removed for periodic application of toxic anti-fouling paints. Additionally the instant invention is directed to coating compositions capable of withstanding both normal and excessive cathodic protective voltages and to coating compositions capable of protecting surfaces against corrosion. Additionally this invention relates to articles such as, for example, pipes, piling, rods, beams, and similar articles coated with these compositions, and to a process for coating these articles.

Numerous bituminous coating compositions are presently in use which are formulated solely for protecting pipes, piling, rods, beams, and like structural articles above ground. Other bituminous coating compositions, particularly the hot applied coatings, are specifically intended for protecting these pipes and like metallic articles when buried in the earth and are ideally suited for this purpose, particularly the coal-tar enamels. However, these coating compositions have not proved to be entirely satisfactory when these articles have been permanently immersed in sea water and are constantly subjected to the attack of marine organisms such as, for example, barnacles, teredos and similar pestiferous creatures. Asphalt enamels have been relatively quickly penetrated by barnacles and teredos enabling sea water to enter the puncture and cause corrosion of the metal surfaces of these articles. Even coal-tar enamels are penetrated by barnacles and teredos although more slowly than are the asphaltic enamels.

The performance of bituminous coating compositions, both of the asphalt and of the coal-tar variety, has not been entirely satisfactory when these coatings have been subjected to unrestricted cathodic protective currents. Occasionally, when installing coated beams, rods, pipe, etc., or driving coated piling, portions of the coating on these structural articles are scraped off. When this occurs, it is possible for current to start flowing from one exposed portion which is the anode, through the sea water or soil electrolytes to another exposed portion of the pipe, piling, beams, etc., which is the cathode. The current will return to the anodic portion through the wall of the pipe, piling, beam, etc.

When such a current flows, metal is removed from this bare anodic portion of the pipe leaving holes or "pits" in the surface of the pipe. In recent years cathodic protection systems have been developed to prevent this corrosion wherein the harmful current flow is stopped or neutralized by the application of a stronger current through the wall of the pipe, piling, etc., in the opposite direction. This opposing or neutralizing electrical current is generally provided by passing current from either surface power lines through a rectifier-sacrificial ground bed installation, or by the installation of sacrificial metallic electrodes composed usually of either magnesium, aluminum or zinc. These cathodic protection units are hung at calculated intervals underwater along the pipe line, pile or beam, etc.

Heretofore cathodic protection engineers recommended initial application of voltages far in excess of those necessary to protect bare metal so as to build up protective calcareous deposits on the bare spots from salts in the sea water. Investigation revealed that many coatings were literally "blasted" off the metal surface by formation of hydrogen blisters when such excessive currents were applied. A voltage of 800 millivolts (this negative potential is measured against a reference saturated calomel half-cell immersed in sea water) will keep bare steel from corroding in sea water. Some of the conventional marine paint compositions cannot withstand even this protective voltage. Certain cold applied coal-tar enamels stand up fairly well under the lower protective voltages but are loosened or disbonded by high potentials. Certain hot applied coal-tar enamels will withstand voltages as high as 1.0 volt but harmful effects such as disbonding and blistering become apparent at about 1.1 to 1.2 volts. Asphalt enamels will loosen and disbond readily from the metallic surfaces after being subjected to 1.0 volts negative to a saturated calomel half-cell in sea water.

It is therefore an object of the present invention to provide an anti-corrosive coating composition which will not be substantially affected by the attack of marine organisms such as, for example, barnacles, teredos, and similar pestiferous creatures, when immersed in water, particularly salt water and brackish water.

Another object is to provide a marine organism-resistant coating composition which is highly effective in protecting pipes, piling, rods and similar articles.

Another object is to provide an anti-corrosive marine organism-resistant coating composition which will withstand intentionally or accidentally applied excessive cathodic protective voltages when the coated pipes, piling, rods, beams or similar articles are under cathodic protection.

An additional object is to provide, as articles of manufacture, structural articles such as pipes, piling, beams, rods and similar articles which have been coated with the anti-corrosive, marine organism-resistant coating composition of the instant invention.

A further object is to provide coated structural articles such as, for example, pipes, or pipe lines coated with the compositions of this invention which possess a desired "negative buoyancy" when laid on the bottom of lakes, rivers and other bodies of water.

Still another object of this invention is to provide a method of coating structural articles such as pipes, beams, rods, etc., which will result in their being rendered substantially resistant to the attack of marine organisms and to corrosion and rusting.

Ancillary and additional objects and advantages will be apparent as the invention is hereinafter described in more detail.

It has now been discovered that the foregoing objects are accomplished by coating compositions comprising an admixture of a major amount of inert, coarse, solid, discrete, water-insoluble, hard particles and a minor amount of a composition containing a filler and either a cut-back-coal digestion pitch or a cut-back-coal-tar pitch. If the foregoing novel composition is to be utilized for coating a structural article such as, for example, a pile which is to be subjected to substantial shock such as driving shock, the coal-tar pitch of the cut-back is advantageously a plasticized coal tar pitch or a coal digestion pitch of the type hereinafter described. However, if the foregoing novel composition is to be utilized in coating, for example, a pipe or pipeline which is not to be subjected to substantial shock, the coal-tar pitch of the cut-back is advantageously an unplasticized or ordinary coal-tar pitch.

The term "coal digestion pitch," as employed herein, is applied to modified pitches obtained by digesting powdered bituminous coal in ordinary pitch and tar heavy oil. These modified pitches are also referred to as plasticized pitches. This mixture is fluxed with additional tar heavy oil if required to give the desired softening point and penetration properties.

The term "unplasticized" is herein used merely to differentiate an ordinary coal-tar pitch from a coal digestion or plasticized pitch.

The term "tar heavy oil," as used herein, designates a tar fraction having not more than 1% distillate at 300° C. and a 25% maximum distillate at 355° C. It has a minimum specific gravity of 1.140 and contains not more than 0.5% water. This oil is not limited to being derived from a tar of any one particular source and can be obtained, for example, from coal tar, heavy water gas tar, light water gas tar, etc.

The term "pitch," as employed herein, is understood in the tar industry to designate a residue of tar distillation having a consistency ranging from that of heavy tar to that of hard pitch or semi-coke. Pitch may have softening points of about 100° to 300° F. (Softening points referred to herein are determined by the A. S. T. M. standard ring and ball method D36-26 unless otherwise specified and penetration values referred to herein are determined by the A. S. T. M. method D5-52.)

The term "structural article" will be used herein to designate pipes, pipe lines, piling, rods, beams, ship bottoms, etc.

"Parts" and "percentages" herein are by weight unless indicated otherwise.

In the preparation of coal digestion pitch or plasticized pitch, powdered bituminous coal is digested with pitch and tar heavy oil at a temperature range of from 270° C. to 350° C. and advantageously at approximately 315° C. until a homogeneous dispersion of the coal in the pitch medium is obtained. With this temperature range, a suitable dispersion is obtained within a reasonable time. This dispersion is then fluxed with additional tar heavy oil, if required, to produce the desired softening point and penetration characteristics. The amount of coal used can ordinarily vary from about 15 to about 30 parts by weight; the amount of tar heavy oil utilized can range from about 30 to about 55 parts by weight, and the pitch can range from approximately 20 to approximately 45 parts by weight, the exact amounts of these materials utilized being dependent, of course, on their respective properties and the properties of the product desired.

Examples of typical coal digestion pitch compositions which may be utilized in the coating compositions of the instant invention are those prepared as follows:

34 parts of coal-tar pitch (softening point 158° F.), 25 parts of powdered bituminous coal, and 41 parts of coal-tar heavy oil are charged to a still or a digesting tank equipped advantageously with a mechanical agitating device to prevent local overheating and provided with heating means. These ingredients are then heated together, advantageously with agitation or stirring, at a temperature of about 315° C. for between two and four hours. At the end of this period, the heating is discontinued. The product is cooled for a brief period of time, discharged from the still, and is then ready for use. The product has a softening point of 208° F. and a penetration at 77° F. of 15 decimillimeters.

Another coal digestion pitch composition which may be utilized in the present novel protective coating composition is prepared by repeating the foregoing procedure using 39 parts of heavy water gas pitch (softening point 140° F.), 21 parts of powdered bituminous coal, and 40 parts of coke oven tar heavy oil. The product has a softening point of 228° F. and a penetration at 32° F. of 12 decimillimeters.

Still another pitch composition which may be employed in our novel composition is prepared by repeating the foregoing initial procedure utilizing 40 parts of coal-tar pitch having a softening point of 130° F., 25 parts of powdered bituminous coal, and 35 parts of coal-tar heavy oil. The resulting product has a softening point of 215° F. and a penetration of 11 decimillimeters at 77° F.

In practising the invention, about 25 to about 35% by weight, advantageously about 30%, of a coal-tar composition of the types hereinafter-described as containing a cut-back-coal digestion pitch and a filler is thoroughly mixed with about 65 to about 75% by weight, advantageously about 70% by weight, of inert, coarse, solid, discrete, water-insoluble, hard particles such as, for example, sharp blasting sand particles. The mixing is continued until a homogeneous admixture is obtained. The coal-tar compositions employed in this novel marine-organism resistant composition contain from about 65 to about 75% by weight, advantageously about 70% by weight, of cut-back-coal digestion pitch and from about 25 to about 35% by weight, advantageously about 30% by weight, of a filler such as, for example, talc, slate dust, ground mica, shale dust, etc.

Other inert, coarse, solid, discrete water-insoluble, hard particles can be utilized in place of the blasting-sand particles such as, for example, the particles or granules which are embedded or partially embedded in the coating compositions of roofing-shingles and which are known in the roofing industry as and which shall be referred to herein as "roofing-shingle granules." Roofing-shingle granules, which are granules or particles of slag, gravel, slate or equivalent materials, are utilized in the coating composition in approximately the same proportion by weight as the blasting-sand particles. When blasting-sand particles are employed in the composition, they are preferably of a size ranging from about 1/64 of an inch to about 1/16 of an inch in diameter and are graded to pass an 8-mesh sieve and to be retained on a 50-mesh sieve. These blasting-sand particles have a specific gravity of from about 0.8 to 1.9. It is to be understood that any inert, coarse, solid, discrete, water-insoluble, hard particles or granules can be utilized in this invention as long as these granules have a Mohs' test hardness value ranging from 5 to 10. Materials falling within this hardness range would include, for example, apatite, feldspar, quartz, topaz, sapphire and diamond. Obviously such materials as diamonds and sapphire would be undesirable due to the high cost of these materials, but nevertheless are included within the concept of this invention as they would provide an impenetrable barrier to barnacles, teredos, etc. It is to be emphasized that a Mohs' test hardness value ranging from 5 to 10 is critical to the operability of the instant invention as it has been found that barnacles and other pestiferous marine organisms will penetrate softer materials in a relatively short time.

Mohs' test for determining the hardness of the foregoing materials is described in the Handbook of Engineering Fundamentals by Ovid W. Eshbach in the chapter entitled "Mechanics of materials" (pages 5–90). In conducting this test, a smooth surface of the mineral to be tested is selected on which a point of the standard is pressed and moved back and forth several times 1/8 of an inch or less. If the mineral is scratched, it is softer than the standard. Two minerals of equal hardness will scratch each other. Pulverulent or splintery materials are "broken down" by the test and yield an "apparent" hardness often much lower than the true hardness. By virtue of this test, Mohs has set up a scale of hardness. In this scale, talc, for example, has a hardness value of 1; apatite, a hardness value of 5; feldspar, a hardness value of 6; quartz, a hardness value of 7; topaz, a hardness value of 8; sapphire, a hardness value of 9; and diamonds, a hardness value of 10. Mohs also has devised a test for the softer minerals wherein a mineral which may be scratched by a finger nail has a hardness up to 2.5; minerals scratched by a copper coin have a hardness up to 3; and by a knife blade, up to a hardness of 5.5.

The following examples are provided to illustrate some preferred composition of the instant invention but are not to be construed as limitations thereon.

*Example I*

|  | Percent |
|---|---|
| Cut-back-coal-digestion pitch, 70 parts } Talc, 30 parts | 30 |
| Blasting sand | 70 |

*Example II*

|  | Percent |
|---|---|
| Cut-back-coal-digestion pitch, 74 parts } Slate dust, 26 parts | 26 |
| Roofing shingle granules | 74 |

*Example III*

|  | Percent |
|---|---|
| Cut-back-coal-digestion pitch, 65 parts } Ground mica, 35 parts | 35 |
| Blasting sand | 65 |

*Example IV*

|  | Percent |
|---|---|
| Cut-back-coal-digestion pitch, 75 parts } Shale dust, 25 parts | 25 |
| Roofing shingle granules | 75 |

*Example V*

|  | Percent |
|---|---|
| Cut-back-coal-digestion pitch, 68 parts } Talc, 32 parts | 32 |
| Roofing shingle granules | 68 |

*Example VI*

|  | Percent |
|---|---|
| Cut-back-coal-digestion pitch, 72 parts } Clay, 28 parts | 28 |
| Blasting sand | 72 |

*Example VII*

|  | Percent |
|---|---|
| Cut-back-coal-digestion pitch, 67 parts } Talc, 33 parts | 34 |
| Blasting sand | 66 |

As has been hereinbefore disclosed, the marine organism-resistant compositions set forth in the foregoing examples are particularly advantageous when the structural articles to be coated such as, for example, piling are subjected to substantial shock such as driving shock. The composition containing the cut-back-coal-digestion pitch and filler, which is mixed with the inert, coarse, solid, discrete, water-insoluble, hard particles or granules as is hereinbefore described, can be prepared by mixing cut-back-coal-digestion pitch and a filler such as talc, slate dust, ground mica, etc., of substantially 200 mesh fineness until the mixture of cut-back and filler becomes homogeneous throughout.

As is hereinbefore pointed out, a cut-back-coal-tar pitch can be employed in the novel marine organism-resistant composition in place of the cut-back-coal digestion pitch when the articles to be coated such as, for example, pipes or pipe lines are not to be subjected to substantial shock. Examples of preferred compositions of this invention containing a cut-back-coal-tar pitch instead of a cut-back-coal-digestion pitch, but which are not to be construed as limitations thereon are:

*Example VIII*

|  | Percent |
|---|---|
| Cut-back-coal-tar pitch, 70 parts } Talc, 30 parts | 30 |
| Blasting sand | 70 |

*Example IX*

|  | Percent |
|---|---|
| Cut-back-coal-tar pitch, 72 parts } Slate dust, 28 parts | 32 |
| Roofing shingle granules | 68 |

*Example X*

|  | Percent |
|---|---|
| Cut-back-coal-tar pitch, 68 parts } Shale dust, 32 parts | 27 |
| Roofing shingle granules | 73 |

*Example XI*

|  | Percent |
|---|---|
| Cut-back-coal-tar pitch, 75 parts } Talc, 25 parts | 35 |
| Blasting sand | 65 |

*Example XII*

|  | Percent |
|---|---|
| Cut-back-coal-tar pitch, 65 parts } Clay, 35 parts | 29 |
| Blasting sand | 71 |

*Example XIII*

|  | Percent |
|---|---|
| Cut-back-coal-tar pitch, 73 parts } Talc, 27 parts | 25 |
| Roofing shingle granules | 75 |

The compositions containing the cut-back-coal-tar pitch and filler can be prepared in a substantially identical manner as are the cut-back-coal-digestion pitch and filler compositions which are previously described.

Fillers powdered sufficiently to pass substantially a 200 mesh sieve are advantageously employed.

The following composition and method of preparation is illustrative of a typical cut-back-coal-digestion pitch suitable for the practice of the instant invention. The percentages throughout this specification are by weight unless otherwise specified.

Coal digestion pitch having a softening point of approximately 135° F. to 230° F. (ring and ball) is blown from a storage tank to a still by means of steam. The temperature of the still is then adjusted to approximately 270° F. If desired, a suitable agitator or mixer may be run in the still to accelerate the temperature adjustment. A coal-tar naphtha having a boiling range of from about 150° C. to 200° C. is then charged to the still in an amount of about 30% by weight. The coal digestion pitch is present in an amount of about 70% by weight. The mixture is then stirred for a brief period of time, about 15 to 20 minutes generally sufficing, by means of a suitable agitator or mixer such as, for example, a sigma blade mixer. At the end of this period, if it is so desired, a deodorant and/or a wetting agent may be incorporated into the mixture. The mixture is then ready to be utilized.

In preparing the cut-back, the amount of coal tar naphtha utilized can range broadly from about 25 to about 35% by weight and the amount of coal digestion pitch employed can range from about 65% to about 75% by weight.

Other solvents can be utilized in whole or in part in place of the solvent naphtha. For example, other low boiling coal-tar solvents, fractions of heavy water-gas tar distillates and of light water-gas tar distillates and petroleum distillates containing a preponderance of aromatics are satisfactory. The boiling points of these solvents can advantageously vary from about 150° C. to about 200° C. Additionally the solvents of the above mentioned boiling ranges can be replaced in whole or in part, if desired, by lower boiling compatible coal-tar solvents such as solvents boiling between 80° C. and 150° C., when quicker drying coating compositions are specified.

The coal-tar solvent naphtha utilized in making the cut-back-coal-digestion pitch can be prepared from a coal-tar distillate from which most of the tar acids and tar bases have been removed. This solvent naphtha has not more than 5% distillate at 150° C. and not less than 90% distillate at 200° C. The fraction of heavy water-gas tar distillate, when used as a solvent in place of solvent naphtha has similarly not more than 5% distillate at 150° C. and not more than 90% distillate at 200° C. The fraction of light water-gas tar distillate which also can be utilized as the solvent in making the cut-back, similarly has not more than 5% distillate at 150° C. and not more than 90% distillate at 200° C.

The heavy water-gas tar from which is obtained the distillate fraction utilized in making the cut-back-coal-digestion pitch is procured from water gas generator plants in which Bunker-C or similar fuel oils are utilized for carbureting. This tar consists mainly of aromatic constituents even though it is produced from a petroleum raw material. In certain industries, heavy water-gas tar is referred to as residuum tar to distinguish it from what is today known as light water-gas tar. Light water-gas tar, a distillate fraction of which can also be utilized as a solvent in making the cut-back-coal digestion pitch, is to be differentiated from heavy water-gas tar and is produced by carbureting petroleum distillates in the carburetor of water-gas plants. Light water-gas tar is also generally referred to as water-gas tar.

In the preparation of a typical cut-back-coal-tar pitch suitable for utilization in the practice of this invention, a substantially identical method can be employed as is employed in the foregoing method of preparing the cut-back-coal-digestion pitch. Coal-tar pitch having softening points of advantageously 150°–160° F. (ring and ball) is utilized in preparing the cut back. Substantially identical solvents can be utilized as are utilized in the preparation of the cut-back-coal-digestion pitch.

In the drawings:

Figure 1 is a longitudinal sectional view through a preferred composite coated pipe of the instant invention.

Fig. 2 represents a transverse sectional view taken substantially on line 2—2 of Fig. 1.

Fig. 3 is an enlarged sectional detail view taken substantially on line 3—3 of Fig. 2.

Fig. 4 is a longitudinal sectional view illustrating a modified form of the coated pipe.

Fig. 5 is a transverse sectional view taken substantially on line 5—5 of Fig. 4.

Fig. 6 represents an enlarged sectional detail view taken substantially on line 6—6 of Fig. 5.

Figure 7:
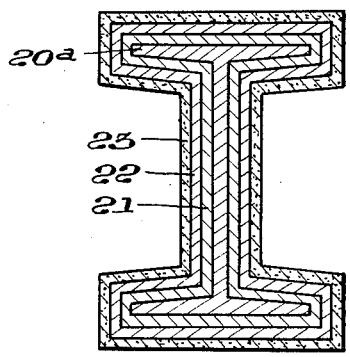
Fig. 7 is a transverse sectional view through a preferred composite coated I-beam of the instant invention.
Figure 8:
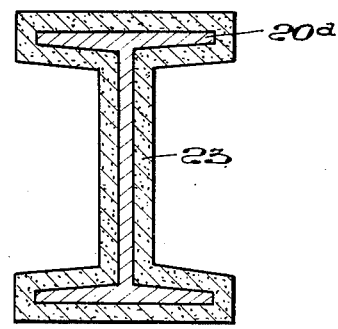
Fig. 8 is a transverse sectional view illustrating a modified form of the coated I-beam.
Figure 9:
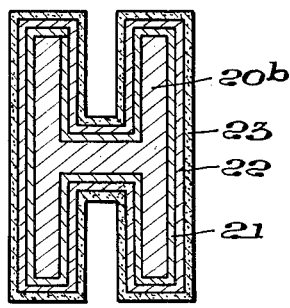
Fig. 9 represents a transverse sectional view through a preferred composite coated H-beam of the instant invention.
Figure 10:
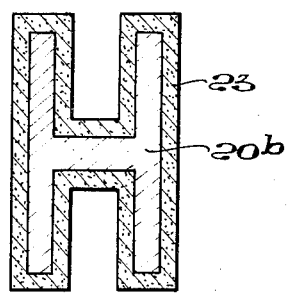
Fig. 10 represents a transverse sectional view illustrating a modified form of the coated H-beam.

As illustrated in Figures 1 and 2 and in more detail in Fig. 3, a structural article such as a ferrous metal pipe 20, or, as shown in Fig. 7, a metal I-beam 20a, or as exemplified by Fig. 9, a metal H-beam 20b is coated with a first protective coating 21 of any of the hereinafter described coal tar compositions A, B, C, D, E, F and G, which are characterized by containing a coal digestion pitch or plasticized pitch as the pitch ingredient which is cut back with a suitable solvent. These coating compositions can contain about 65 to about 75% by weight of cut-back-coal-digestion pitch and about 25 to about 35% by weight of a filler. Examples of coating compositions which are eminently adapted for this first protective coating 21, in which the percentages are by weight unless otherwise specified, are:

*Coating composition A*

| | Percent |
|---|---|
| Cut-back-coal-digestion pitch | 70 |
| Talc | 30 |

*Coating composition B*

| | Percent |
|---|---|
| Cut-back-coal-digestion pitch | 65 |
| Ground mica | 35 |

*Coating composition C*

| | Percent |
|---|---|
| Cut-back-coal-digestion pitch | 74 |
| Slate dust | 26 |

*Coating composition D*

| | Percent |
|---|---|
| Cut-back-coal-digestion pitch | 75 |
| Shale dust | 25 |

*Coating composition E*

| | Percent |
|---|---|
| Cut-back-coal-digestion pitch | 68 |
| Talc | 32 |

*Coating composition F*

| | Percent |
|---|---|
| Cut-back-coal-digestion pitch | 72 |
| Clay | 28 |

*Coating composition G*

| | Percent |
|---|---|
| Cut-back-coal-digestion pitch | 67 |
| Talc | 31 |

The composition set forth in the foregoing examples can be prepared by mixing cut-back-coal-digestion pitch and a filler of substantially 200 mesh fineness until the mixture of cut-back and filler becomes homogeneous throughout. The cut-back should be cool or close to room temperature and not hot when the filler is mixed therewith. If desired, small amounts of a wetting agent can be added to the constituents prior to final mixing. Wetting agents of the sulphonated bicarboxy acid ester type marketed under the trademark "Aerosol," and the sodium alkyl benzene sulfonate type sold under the trademarks "Nacconol" and "Santomerse" are suitable. Covering the first protective coating 21 is a second protective coating 22 which is of the substantially identical composition as the first protective coating 21, viz., a composition such as is set forth in coating compositions A, B, C, D, E, F and G. However, if this structural article is a pipe or pipe line which is not to be subjected to substantial shock such as, for example, driving shock, the first protective coating 21 and the second protective coating 22 are of the substantially identical compositions as are set forth in the foregoing coating compositions A, B, C, D, E, F and G except that a cut-back-coal-tar pitch can be substituted in the composition for the cut-back-coal-digestion pitch. Covering this second protective coating 22 is a third coating 23 of the marine organism-resistant composition which is hereinbefore described in Examples I–VII. Here again, if the structural article is not to be subjected to substantial shock, a cut-back-coal-tar pitch is employed in the marine organism-resistant composition in place of the cut-back-coal-digestion pitch. These latter coating compositions containing the cut-back-coal-tar pitch are set forth in Examples VIII–XIII.

With reference now to Figures 4, 5, 6, 8 and 10, which illustrate a modification of the article of manufacture of this invention, the pipe 20 (Figure 4, 5, and 6), I-beam 20a (Figure 8) or H-beam 20b (Figure 10) can, if it is so desired, be coated solely with the coating 23 of the marine organism-resistant coating composition.

Prior to the application of the coating materials to the ferrous metal pipe 20, I-beam 20a or H-beam 20b illustrated in Figures 1, 2, 3, 7 and 9, the surface thereof is advantageously thoroughly cleaned to remove foreign material such as oil, grease, rust, mill scale, welding scale, dirt, dust, etc. This cleaning is advantageously accomplished by means of sand blasting but may also be carried out with suitable wire brushes; by treating the surfaces of these articles with a pickling solution such as sulfuric or nitric acid; applying steam to the surfaces thereof; subjecting the surfaces of these articles to the action of manually or mechanically operated knives, scrapers, etc.; or by flame cleaning. One of the hereinbefore described coating compositions A, B, C, D, E, F or G, which is characterized by containing coal digestion pitch or plasticized pitch as the pitch ingredient, is then applied to the structural article as the first protective coating 21 at a rate from about 50 to about 60 square feet per gallon either by brushing or by spraying with any suitable spraying apparatus. After this first protective coating 21 has dried, which may take from 24 to 70 hours depending on the weather and humidity, a second protective coating 22 of the identical composition is applied over the first protective coating 21 also advantageously at a rate of from about 50 to about 60 square feet per gallon. The thickness of each of these protective coatings is advantageously at least about 1/64 of an inch when dry. Substantially thicker coatings can be applied, however, if desired. It is to be understood that both the first protective coating 21 and the second protective coating 22 are essential if the structural article is to be protected against corrosion. If the second protective coating were omitted, water would be able to contact the surface of the structural article by passing through the pores in the coating composition caused by the evaporation of the solvent. This second protective coating 22 acts as a "sealer" in that it seals up these pores caused by the evaporation of the solvent. After this second protective coating 22 has dried, which also takes from about 24 to 70 hours depending on the weather, the previously described marine organism-resistant composition is applied over the second protective coating as the third coating 23. This marine organism-resistant coating 23 is applied by troweling, pouring, dipping or by the utilization of any suitable coating apparatus known in the tar industry at a thickness of from about 1/4" to about 3/8" and advantageously at about 5/16". Substantially thicker coating can be applied if desired. The coating is then allowed to harden.

As is previously disclosed, if the structural article is not to be subjected to substantial shock, such as driving shock, the coating compositions of the first protective coating 21, the second protective coating 22, and the third marine organism-resistant coating composition 23 are applied in a similar manner and are similar to the compositions utilized in coating structural articles which are to be subjected to substantial shock, the difference being in that a cut-back-coal-tar pitch is utilized in the compositions employed in each coating in place of the cut-back-coal-digestion pitch.

With reference to Figures 4, 5, 6, 8 and 10, it is to be noted that the structural articles illustrated do not possess the first protective coating 21 and the second protective coating 22 which the structural articles illustrated by Figures 1, 2, 3, 7 and 9 possess. In coating this modified structural article, the coating operations described with respect to the application of the first protective coating and the second protective coating are simply disregarded, and the application of the marine organism-resistant coating 23 is carried out on the advantageously cleaned structural article in the manner hereinbefore-described. These modified coated structural articles are resistant to barnacles, teredos and similar pestiferous organisms.

As another embodiment of the instant invention, the piling, I-beam, H-beam or other structural article is advantageously cleaned and thereafter coated with a first protective coating 21 and a second protective coating 22 of the previously-described compositions containing either the cut-back-coal-digestion pitch or the cut-back-coal-tar pitch in the manner hereinbefore described, with regard to the structural articles exemplified by Figures 1, 2, 3, 7 and 9. After the second protective coating 22 has dried, a stratum or layer of inert, coarse, solid, discrete, water-insoluble, hard particles such as, for example, blasting-sand particles or roofing shingle granules are applied to the coated structural article in any suitable manner in a thickness of advantageously about 1/16" to about 1/8" and desirably at about 3/32", advantageously while the structural article is in a horizontal position. A thicker layer of particles can be applied if desired with no harmful effects. An external coating of one of the hereinbefore described coating compositions, which are utilized for the first protective coating 21 and the second protective coating 22, is then applied over the stratum of particles at approximately the same thickness as the first protective coating. However, an external coating of a greater thickness can be applied if desired. This method produces a particularly desirable result in that the external coating floods through and penetrates the stratum or layer of inert, coarse, solid, discrete, water-insoluble, hard particles bonding them firmly to the second protective coating 22 resulting in an exterior coating of this coal-tar composition filled with these particles or granules which is substantially the same as the external coating of the previously-described coal-tar composition containing these particles or granules, which is applied over the second protective coating 22, as is described with regards the coated structural articles illustrated by Figures 1, 2, 3, 7 and 9. When the first protective coating and the second protective coating contain a cut-back-coal-tar pitch, the composition employed in the external coating is advantageously also a cut-back-coal-tar pitch. This method of coating is often more convenient to use than the previously-described method of applying the novel admixture of the coal-tar composition and granules or particles. Structural articles coated in accordance with this method are protected from barnacle and teredo attack by penetration and are also resistant to accidentally or intentionally applied excessive cathodic protective voltages.

As an additional embodiment of the instant invention, the piling, H-beam, I-beam or other structural article is advantageously cleaned and thereafter coated with the first protective coating 21 and the second protective coating 22 in the manner hereinbefore described. After the second protective coating has dried, a third coating is applied over the second protective coating at a rate of approximately 50 to 60 square feet per gallon. While this third protective coating is still tacky and adhesive, a stratum or layer of inert, coarse, solid, discrete, water-insoluble, hard particles are applied to the coated structural article in any suitable manner in a thickness or advantageously about 1/16" to about 1/8" and desirably at about 3/32", advantageously while the structural article is in a horizontal position. Here again, a thicker layer of particles or granules can be applied if desired. An external coating of one of the previously-described coating compositions, which are utilized for the first protective coating 21 and the second protective coating 22, is then applied over the layer of particles at a rate of from about 100 to about 150 square feet per gallon, although a substantially greater thickness of the composition can be applied if desired. The coating is then permitted to harden. When the coating composition utilized in this external coating contains a cut-back-coal-tar pitch, as distinguished from a cut-back-coal-digestion pitch, as a constituent, the composition employed in the first protective coating, the second protective coating and the third coating advantageously also contains a cut-back-coal-tar pitch. This method also produces a highly desirable result in that the external coating floods through and impregnates the stratum of particles or granules bonding them firmly to the third coating resulting in an exterior coating which is again substantially the same as the external coating of the hereinbefore-described coal-tar particle or granule composition which is applied over the second protective coating as is previously described. Structural articles coated in accordance with this novel method are protected from barnacle and teredo attack by penetration and are also resistant to accidentally or intentionally applied excessive cathodic protective voltages. Any of the previously described inert, coarse, solid, discrete, water-insoluble, hard particles or granules having a Mohs' test hardness value of from 5 to 10 can be employed with excellent results in the foregoing methods.

The term "hard" is used herein to designate granules or particles having a Mohs' test hardness value ranging from 5 to 10, granules or particles of a relatively high compression strength, and granules or particles that are not easily cut or separated into parts and are not easily penetrated.

The terms "granules" and "particles" are used interchangeably throughout the specification. These particles or granules have a relatively high specific gravity which is highly advantageous when "negative buoyancy" is desired. Frequently it is necessary to position concrete around the coated pipe or to use special ground clamps on the bottom of rivers, lakes, etc., to prevent movement or floating which might result in leaks in the pipe line. This problem is obviated by the utilization of these particles in coating compositions of this invention and by the application of these tar coatings.

The annual cost of operating a cathodic system can be kept to a minimum by coating the structural articles in the manner described herein, because the cost of cathodic protection per year is directly proportional to the metal surface exposed, which will increase with years of service through penetration of coatings by marine organisms unless a system resistant to marine organisms and capable of withstanding cathodic protective potentials is used.

It is to be understood that the novel compositions of this invention are not toxic to marine organisms like the toxic anti-fouling marine paint compositions. On the contrary, the barnacles, teredos, etc. as well as marine vegetable growths and other organisms can readily attach themselves to the hard surfaces provided by the novel coating compositions but cannot penetrate or disrupt the coating and therefore no punctures can be made through the anti-corrosion barrier coat to the metal itself.

The invention claimed is:

1. A barnacle and teredo resistant composition which is flowable at normal temperature and which is also resistant to excessive cathodic protective voltages and to pile driving shock, which comprises a mixture of from about 65% to about 75% by weight of inert, coarse, solid, discrete, water-insoluble, hard particles of a size which are retained on a 50 mesh sieve and pass an 8 mesh sieve and having a Mohs' test hardness of from 5 to 10 and from about 35% to about 25% by weight of a composition containing from about 25% to about 35% by weight of a mineral filler of a size to pass substantially a 200 mesh sieve and from about 75% to about 65% by weight of a cut-back-coal digestion pitch, said cut-back-coal-digestion pitch containing from about 25% to about 35% by weight of coal-tar solvent boiling in the range of from about 80° to about 200° C. and from about 75% to about 65% by weight of coal-digestion pitch having a ring and ball softening point of from about 135° to about 230° F.

2. A composition in accordance with claim 1 wherein the inert, coarse, solid, discrete, water-insoluble, hard particles are blasting sand particles.

3. A method for rendering structural articles resistant to the attack of pestiferous marine organisms and to corrosion, which comprises cold applying to a structural article a first protective coating of a composition flowable at normal temperature containing from about 25% to about 35% by weight of a mineral filler of a size to pass substantially a 200 mesh sieve and from about 75% to about 65% by weight of a cut-back-coal-tar pitch, permitting said first protective coating to dry, cold applying a second protective coating of a composition substantially identical to the composition of said first protective coating over the dry first protective coating to seal pores in said first protective coating caused by evaporation of solvent therefrom, permitting said second protective coating to dry, applying a stratum of inert, coarse, solid, discrete, water-insoluble, hard particles of a size which are retained on a 50 mesh sieve and pass an 8 mesh sieve and having a Mohs' test hardness of from 5 to 10 to the dry second protective coating, and thereafter cold applying an external coating of a composition flowable at normal temperature containing from about 25% to about 35% by weight of a mineral filler of the aforesaid 200 mesh sieve size and from about 75% to about 65% by weight of a cut-back-coal-tar pitch over said stratum of particles, said cut-back-coal-tar pitch of the composition utilized in said first, second and external coatings each containing from about 25% to about 35% by weight of coal-tar solvent boiling in the range of from about 80° to about 200° C. and from about 75% to about 65% by weight of coal-tar pitch.

4. A method for rendering structural articles resistant to the attack of pestiferous marine organisms and to corrosion, which comprises cold applying to a structural article a first protective coating of a composition flowable at normal temperature containing from about 25% to about 35% by weight of a mineral filler of a size to pass substantially a 200 mesh sieve and from about 75% to about 65% by weight of a cut-back-coal-digestion pitch, permitting said first protective coating to dry, cold applying a second protective coating of a composition substantially identical to the composition of said first protective coating over the dry first protective coating to seal pores in said first protective coating caused by evaporation of solvent therefrom, permitting said second protective coating to dry, applying a stratum of inert, coarse, solid, discrete, water-insoluble, hard particles of a size which are retained on a 50 mesh sieve and pass an 8 mesh sieve and having a Mohs' test hardness of from 5 to 10 to the dry second protective coating, and thereafter cold applying an external coating of a composition flowable at normal temperature containing from about 25% to about 35% by weight of a mineral filler of the aforesaid 200 mesh sieve size and from about 75% to about 65% by weight of a cut-back-coal-digestion pitch over said stratum of particles, said cut-back-coal-digestion pitch of the composition utilized in said first, second and external coatings each containing from about 25% to about 35% by weight of coal-tar solvent boiling in the range of from about 150° to about 200° C. and from about 75% to about 65% by weight of coal-digestion pitch having a ring and ball softening point of from about 135° to about 230° F.

5. A method in accordance with claim 4 wherein the inert, coarse, solid, discrete, water-insoluble, hard particles are blasting sand particles.

6. A method for rendering structural articles resistant to the attack of pestiferous marine organisms and to corrosion, which comprises cold applying to a structural article a first protective coating of a composition flowable at normal temperature containing from about 25% to about 35% by weight of a mineral filler of a size to pass substantially a 200 mesh sieve and from about 75% to about 65% by weight of a cut-back-coal-tar pitch, permitting said first protective coating to dry, cold applying a second protective coating of a composition substantially identical to the composition of said first protective coating over the dry first protective coating to seal pores in said first protective coating caused by evaporation of solvent therefrom, permitting said second protective coating to dry, cold applying a third protective coating of a composition substantially identical to the composition of said first protective coating over the dry second protective coating, permitting said third protective coating to only partially dry, applying to said partially dry third protective coating a stratum of inert, coarse, solid, discrete, water-insoluble, hard particles of a size which are retained on a 50 mesh sieve and pass an 8 mesh sieve and having a Mohs' test hardness of from 5 to 10, and thereafter cold applying an external coating of a composition flowable at normal temperature containing from about 25% to about 35% by weight of a mineral filler of the aforesaid 200 mesh sieve size and from about 75% to about 65% by weight of a cut-back-coal-tar pitch over said stratum of particles, said cut-back-coal-tar pitch of the composition utilized in said first, second, third and external coatings each containing from about 25% to about 35% by weight of coal tar solvent boiling in the range of from about 80° to about 200° C. and from about 75% to about 65% by weight of coal-tar pitch.

7. A method for rendering structural articles resistant to the attack of pestiferous marine organisms and to corrosion, which comprises cold applying to a structural article a first protective coating of a composition flowable at normal temperature containing from about 25% to about 35% by weight of a mineral filler of a size to pass substantially a 200 mesh sieve and from about 75% to about 65% by weight of a cut-back-coal-digestion pitch, permitting said first protective coating to dry, cold applying a second protective coating of a composition substantially identical to the composition of said first protective coating over the dry first protective coating to seal pores in said first protective coating caused by evaporation of solvent therefrom, permitting said second protective coating to dry, cold applying a third protective coating of a composition substantially identical to the composition of said first protective coating over the dry second protective coating, permitting said third protective coating to only partially dry, applying to said partially dry third protective coating a stratum of inert, coarse, solid, discrete, water-insoluble, hard particles of a size which are retained on a 50 mesh sieve and pass an 8 mesh sieve and having a Mohs' test hardness of from 5 to 10, and thereafter cold applying an external coating of a composition flowable at normal temperature containing from about 25% to about 35% by weight of a mineral filler of the aforesaid 200 mesh sieve size and from about 75% to about 65% by weight of a cut-back-coal-digestion pitch over said stratum of particles, said cut-back-coal-digestion pitch of the composition utilized in said first, second, third and external coatings each containing from about 25% to about 35% by weight of coal-tar solvent boiling in the range of from about 150° to about 200° C. and from about 75% to about 65% by weight of coal-digestion pitch having a ring and ball softening point of from about 135° to about 230° F.

8. A method in accordance with claim 7 wherein the inert, coarse, solid, discrete, water-insoluble, hard particles are blasting sand particles.

9. A method for rendering structural articles resistant to the attack of pestiferous marine organisms and to corrosion, which comprises cold applying to a structural article a first protective coating of a composition flowable at normal temperature containing from about 25% to about 35% by weight of a mineral filler of a size to pass substantially a 200 mesh sieve and from about 75% to to about 65% by weight of a cut-back-coal-tar pitch, permitting said first protective coating to dry, cold applying a second protective coating of a composition substantially identical to the composition of said first protective coating over the dry first protective coating to seal pores in said first protective coating caused by evaporation of solvent therefrom, permitting said second protective coating to dry, and thereafter cold applying an external coating over the dry second protective coating of a marine organism-resistant composition flowable at normal temperature comprising from about 65% to about 75% by weight of inert, coarse, solid, discrete, water-insoluble, hard particles of a size which are retained on a 50 mesh sieve and pass an 8 mesh sieve and having a Mohs' test hardness of from 5 to 10 and from about 35% to about 25% by weight of a cut-back-coal-tar pitch composition containing from about 25% to about 35% by weight of a mineral filler of the aforesaid 200 mesh sieve size and from about 75% to about 65% by weight of a cut-back-coal-tar pitch, said cut-back-coal-tar pitch of the composition utilized in said first, second and external coatings each containing from about 25% to about 35% by weight of a coal-tar solvent boiling in the range of from about 80° to about 200° C. and from about 75% to about 65% by weight of coal-tar pitch.

10. A method for rendering structural articles resistant to the attack of pestiferous marine organisms and to corrosion, which comprises cold applying to a structural article a first protective coating of a composition flowable at normal temperature containing from about 25% to about 35% by weight of a mineral filler of a size to pass substantially a 200 mesh sieve and from about 75% to about 65% by weight of a cut-back-coal-digestion pitch, permitting said first protective coating to dry, cold applying a second protective coating of a composition substantially identical to the composition of said first protective coating over the dry first protective coating to seal pores in said first protective coating caused by evaporation of solvent therefrom, permitting said second protective coating to dry, and thereafter cold applying an external coating over the dry second protective coating of a marine organism-resistant composition flowable at normal temperature comprising from about 65% to about 75% by weight of inert, coarse, solid, discrete, water-insoluble, hard particles of a size which are retained on a 50 mesh sieve and pass an 8 mesh sieve and having a Mohs' test hardness of from 5 to 10 and from about 35% to about 25% by weight of a cut-back-coal-digestion pitch composition containing from about 25% to about 35% by weight of a mineral filler of the aforesaid 200 mesh size and from about 75% to about 65% by weight of a cut-back-coal-digestion pitch, said cut-back-coal-digestion pitch of the composition utilized in said first, second and external coatings each containing from about 25% to about 35% by weight of a coal-tar solvent boiling in the range of from about 150° to about 200° C. and from about 75% to about 65% by weight of coal-digestion pitch having a ring and ball softening point of from about 135° to about 230° F.

11. A method in accordance with claim 10 wherein the inert, coarse, solid, discrete, water-insoluble, hard particles are blasting sand particles.

References Cited in the file of this patent
UNITED STATES PATENTS

| | | |
|---|---|---|
| 1,948,007 | Putnam | Feb. 20, 1934 |
| 2,047,772 | Eckert | July 14, 1936 |
| 2,228,102 | Yeager | Jan. 7, 1941 |
| 2,364,460 | McLean | Dec. 5, 1944 |
| 2,472,100 | Fair | June 7, 1949 |